Jan. 17, 1967  D. P. DYER, JR  3,298,223
TORQUE SENSING WHEEL STRUCTURE
Filed Jan. 21, 1965  2 Sheets-Sheet 1

INVENTOR.
DANIEL P. DYER, JR.
BY
John B Sowell
ATTORNEY

INVENTOR.
DANIEL P. DYER, JR.
BY
John B Sowell
ATTORNEY

United States Patent Office 3,298,223
Patented Jan. 17, 1967

3,298,223
TORQUE SENSING WHEEL STRUCTURE
Daniel P. Dyer, Jr., Grosse Pointe Park, Mich., assignor to The Budd Company, Philadelphia, Pa., a corporation of Pennsylvania
Filed Jan. 21, 1965, Ser. No. 426,882
7 Claims. (Cl. 73—128)

This invention relates to a torque sensing wheel device and more particularly to a novel wheel structure for determining torsional driving or retarding forces exerted on the wheels of an automobile.

Heretofore stationary dynamometers have been employed to determine the horsepower and torque transmitted through the wheels of an automobile. However, such devices can neither satisfactorily simulate actual operating conditions and environment, nor can they imitate the transient torque variations and shifting brake ratios. In testing the braking forces exerted by modern disk and drum brakes (or combinations of disk and drum brakes), the very high rate of energy absorption, and the resulting changes of friction values, cause a shift of the workload (ratio of the work of each brake to the total work of all brakes). Consequently, the braking characteristics and handling stability of the vehicle can only be determined by road test.

An advantage of the present invention resides in the ability to indicate directly the torsional driving and/or braking forces acting through a wheel or wheels of an automobile under either actual or simulated road conditions.

An object of the present invention is to provide a torque sensing wheel device easily removable from or insertable on an axle of an automobile.

Another object of the present invention is to provide a torque sensing wheel structure that maintains the tires and brakes in their normal relative positions during operational tests.

A further object of the present invention is to provide a novel wheel and hub structure having a torque sensing transducer interposed between two independently rotatable members so that the output of the transducer is proportional to the torsional loading of the wheel.

Therefore, in general there is provided a rotatable hub having a rotatable brake member affixed thereto, a set of bearings mounted on the outside of said hub, a torsion lever affixed to said hub, a wheel disk member mounted on said bearings and rotatable relative to said hub, a rim affixed to said disk member and adapted to support a tire thereon, a torsion stop plate affixed to said disk member, and a transducer mounted between said torsion lever and said torsion stop plate, whereby torsional forces transmitted to said hub from said rotatable brake member are transmitted to said rim and said tire through said torsion lever and said transducer, said transducer providing an accurate indication of the torsional forces acting on said wheel disk.

Other objects and features of the invention will be apparent from the following description of the accompanying drawing wherein.

Figure 1:
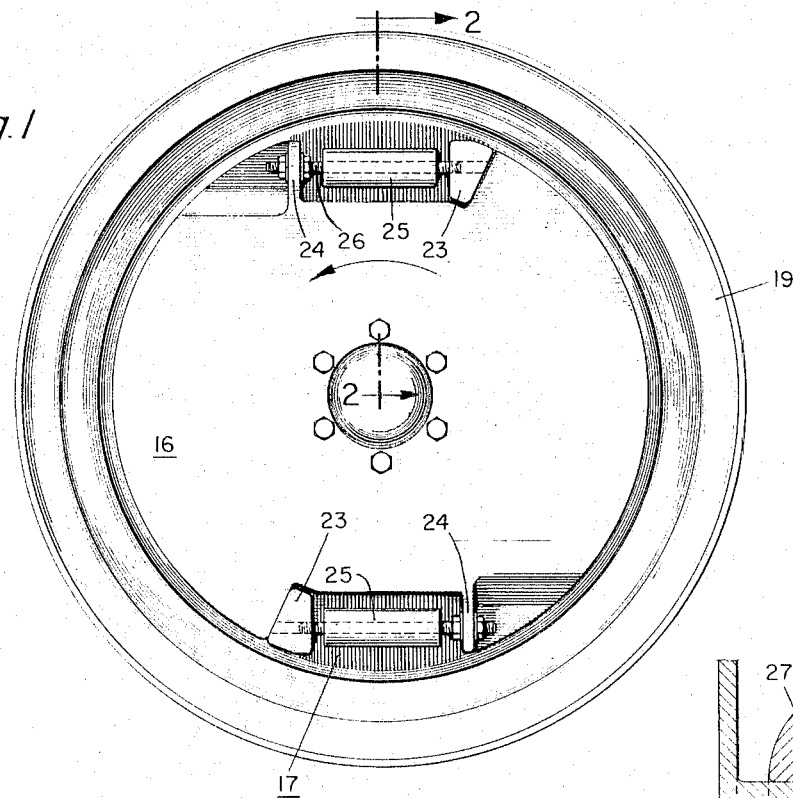
FIG. 1 is an elevation of a wheel structure constructed according to a preferred embodiment of the present invention.
Figure 2:
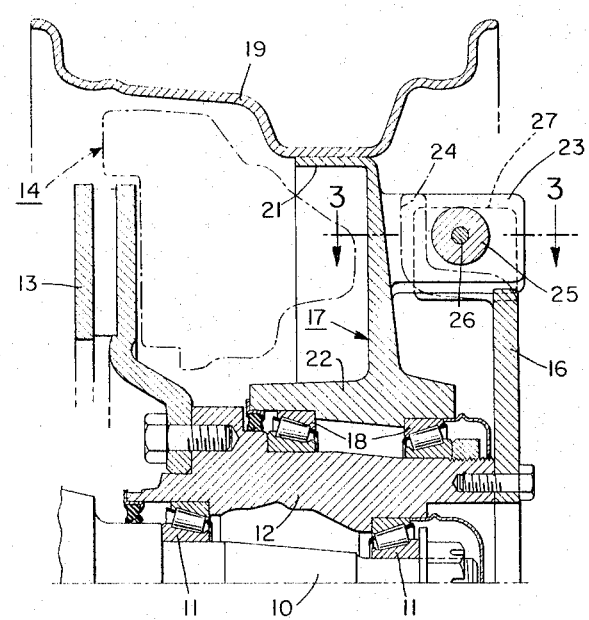
FIG. 2 is a half section in elevation taken at line 2—2 of FIG. 1.
Figure 3:
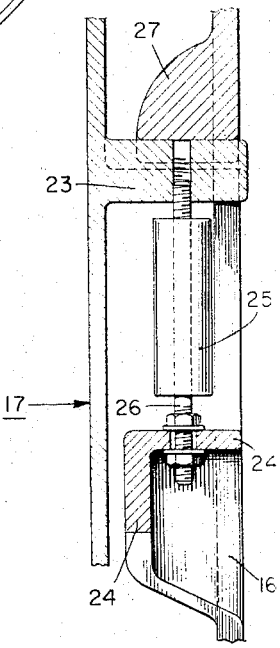
FIG. 3 is an enlarged plan view of the transducer taken at line 3—3 of FIG. 2.

Referring now to FIGS. 1 to 3 which show a preferred embodiment of the present invention, an axle 10 of the front wheel assembly of an automobile has mounted thereon a first set of standard roller bearings 11. These bearings are preferably identical to the original automobile equipment. Rotatably mounted on the outer race of the bearings 11 is a hub structure 12. A brake disk 13 of a disk brake 14 is affixed to the inner end of the hub 12, and a torsion lever 16 is affixed to the outer end of the hub 12 by suitable screw means. Wheel disk member 17 is mounted on a second set of standard bearings 18 intermediate the ends of hub 12. A standard rim 19 is mounted on the axially turned outer perimeter portion 21 of the wheel disk member 17 by welding, rivets or other means. The radially inner portion of wheel disk member 17 is made in the form of a hub portion 22 which is mounted on the outer race of bearings 18. A torsion stop plate 23 is connected to the disk member 17 and extends axially outward therefrom into the radial path of the torsion lever 16. Interposed between the ear 24 or torsion lever 16 and stop plate 23 is a transducer 25 designed to indicate tension and/or compression forces. In the preferred embodiment, a calibrated rod 26 or other form of force transducer is equipped with strain gages attached thereto; the electrical connections taken from the strain gages are connected through slip rings to recording equipment located in the vehicle under test (not shown). Similar or equivalent electrical gages are well-known, but do not constitute a part of the present wheel structure.

Ear 25 is shown in phantom lines in FIG. 2 to indicate that the ear 24 is actually in front of stop plate 23; safety stop 27 is shown in dotted lines to indicate that stop 27 is behind stop plate 23. Rod 26 is adjustable to create a small clearance between safety stop 27 and stop plate 23, however, when running brake test it may be desirable to have zero clearance or even a preload on the transducer so that acceleration forces are not transmitted to the transducer 25 but only deceleration or braking forces are transmitted to the transducer 25.

Both disk member 17 and torsion lever 16 are made symmetrical, and a pair of transducers 25 is located symmetrically opposite each other. This arrangement permits the novel wheel structure to be balanced as required for higher rotational speed encountered during high speed braking and/or acceleration test.

The pairs of transducers may be wired together to further increase the accuracy of torsional forces.

An important feature of the present invention resides in the ability to obtain actual torsional-force data unaffected by the weight or loading on the wheels. The weight being carried through the bearings 18, no weight is carried through the transducer 25. Further accuracy is achieved because the brake, hub and rim of the novel device are maintained in the original location relative to each other.

Figure 4:
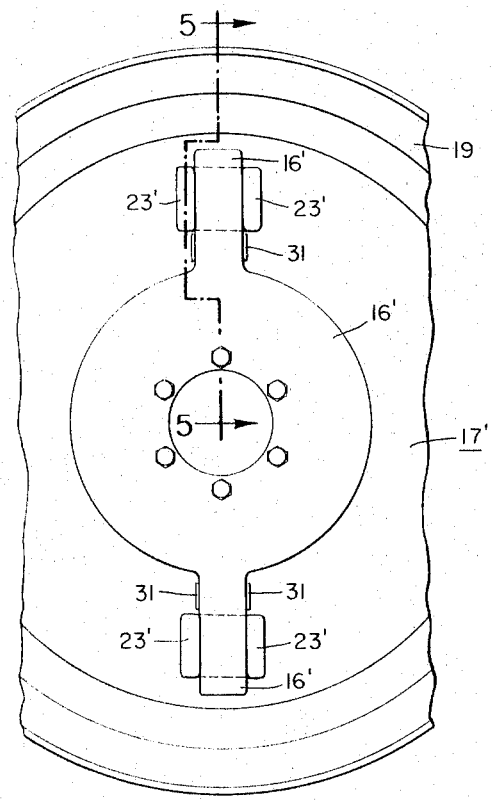
FIG. 4 is a partial elevation of another wheel structure embodying the present invention.
Figure 5:
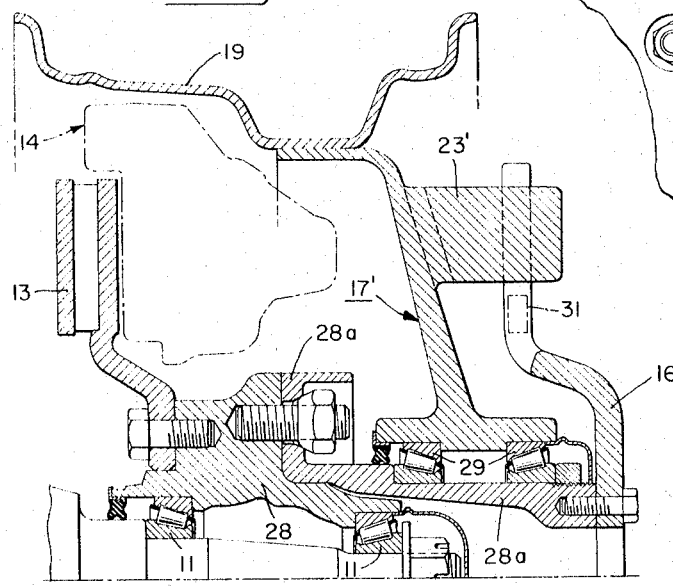
FIG. 5 is a half section in elevation taken at line 5—5 of FIG. 4.

FIGS. 4 and 5 illustrate a modified form of the wheel structure. A hub 28 is mounted on the bearings 11 and a hub extension 28a is affixed to the hub 28. Standard bearings 29 are mounted on the outside of hub extension 28a rotatably supporting modified disk member 17'. Torsion lever 16' is mounted on hub extension 28a and extends radially outward positioned between a pair of stop plates 23' provided on disk member 17'. Strain gages 31 may be affixed to the outer ends of lever 16', intermediate stop plates 23' and hub extension 28a. This modified embodiment, employing hub extension 28a, is adapted to be mounted directly to the original equipment hub 28 of an automobile.

Figure 7:
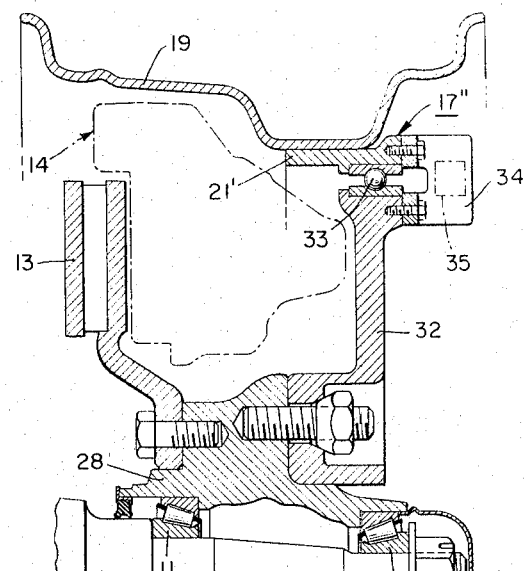
FIG. 7 is an offset half section taken at line 7—7 of FIG. 6.
Figure 6:
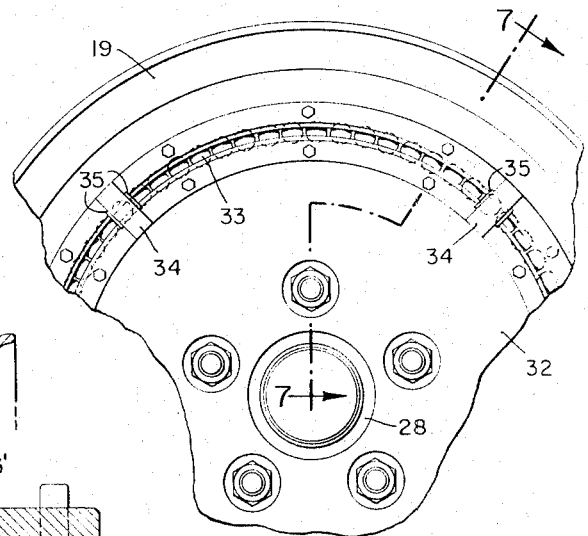
FIG. 6 is a partial elevation of another wheel structure embodying the present invention.

FIGS. 6 and 7 illustrate another modified form wherein the wheel structure is mounted directly to a hub extension 32 on the hub 28, thus, permitting extremely simple installation and removal of the torque sensing wheel device.

The outer perimeter portion 21' of the wheel disk member 17" supports a rim 19 and is rotatably mounted on the hub extension 32 by standard bearings 33 formed as a continuous ring.

The torsion lever 34 is connected to hub extension 32 and in this modified embodiment is also connected to wheel disk member 17". The strain or load imparted to the torsion lever may be indicated by strain gages 35 or other suitable type transducers inserted between the hub and the wheel disk member, as already explained.

The foregoing embodiments have been illustrated with disk brakes, however, the principles are applicable to drum brakes. The embodiments shown all illustrate a rotatable hub mounted on a non-rotatable axle 10. It should be obvious that the novel torque sensing wheel device can be mounted on a rotatable hub which is affixed to a rotatable axle.

Having explained the superiority of the principles involved in the novel torque sensing wheel device, having the rim and/or wheel disk member mounted rotatable relative to the hub and/or hub extension, many equivalents will suggest themselves to those skilled in the art. It is accordingly desired that the appended claims be given a broad interpretation commensurate with the scope of the invention in the art.

What is claimed is:

1. A torque sensing wheel device adapted to be mounted on the hub of an automobile having a brake member affixed to the hub comprising, a hub extension member, a torsion lever affixed to said hub extension, a rim adapted to support a tire, a wheel disk member connected to said rim, a set of bearings rotatably connecting said wheel disk member to said hub extension, and a transducer connected between said torsion lever and said wheel disk member, said transducer being adapted to indicate the torsional forces tending to rotate said wheel disk member relative to said hub extension.

2. A torque sensing wheel device of the type defined in claim 1, wherein said hub extension is an integral part of said hub, said torsion lever is provided with an inwardly extending ear, said wheel disk member is provided with an outwardly extending torsion stop plate positioned in the same radial plane as said ear on said torsion lever, and said transducer comprises a force sensing device connected between said stop plate and said ear.

3. A torque sensing wheel device of the type defined in claim 1, wherein said hub extension is provided with an axially extended cylindrical member for mounting said bearings, and said transducer comprises strain gage means affixed to the radially outer end of said torsion lever at a point between said wheel disk member and the radially inner end of said torsion lever.

4. A torque sensing wheel device of the type defined in claim 1, wherein said hub extension is provided with a radially extended disk for mounting said bearings, and said torsion lever comprises a continuous member interconnecting said wheel disk member and said hub extension.

5. A torque sensing wheel device comprising, a rotatable hub mounted on an axle, a set of bearings mounted on said hub, a wheel disk member rotatably mounted on said bearings, a rim mounted on said wheel disk member adapted to support an inflated tire, a torsion lever connected to said hub at the outer end, said hub being adapted to have a brake member affixed thereto at the inner end, and a transducer connected to said torsion lever intermediate the hub and said wheel disk member.

6. A torque sensing wheel of the type mountable on a rotatable hub of an automobile comprising, an axially elongated cylindrical hub, a set of bearings mounted on the outer diameter of said hub, a disk wheel rotatably mounted on said set of bearings, a pair of axially outwardly extending torsion stop plates connected to said disk wheel, a torsion lever connected to said hub and extending radially outward therefrom, said lever having at its radially outward end a transducer mounting portion located in the same radial plane as said stop plates and spaced circumferentially adjacent thereto, and a transducer connected to said torsion lever calibrated to indicate the torsional forces exerted on said torsion lever by said torsion stop plates.

7. A torque sensing wheel of the type mountable on a rotatable hub of an automobile comprising, a radially extending hub extension connected to said hub, a set of bearings mounted on the outer diameter of said hub extension, a wheel member rotatably mounted on said set of bearings, torsion stop means connected to said wheel member and to said hub extension and adapted to transmit torsional forces therebetween, and a transducer connected to said torsion stop means calibrated to indicate said torsional forces.

References Cited by the Examiner

UNITED STATES PATENTS

| | | | |
|---|---|---|---|
| 1,999,947 | 4/1935 | Ross | 73—129 |
| 2,124,960 | 7/1938 | Waring et al. | 73—129 |

RICHARD C. QUEISSER, *Primary Examiner.*

C. A. RUEHL, *Assistant Examiner.*